(12) United States Patent
Ng

(10) Patent No.: US 7,343,676 B2
(45) Date of Patent: Mar. 18, 2008

(54) METHOD OF RESTORING DIMENSIONS OF AN AIRFOIL AND PREFORM FOR PERFORMING SAME

(75) Inventor: Sor Tin Ng, Singapore (SG)

(73) Assignee: United Technologies Corporation, Hartford, CT (US)

( * ) Notice: Subject to any disclaimer, the term of this patent is extended or adjusted under 35 U.S.C. 154(b) by 325 days.

(21) Appl. No.: 10/767,478

(22) Filed: Jan. 29, 2004

(65) Prior Publication Data
US 2005/0166397 A1 Aug. 4, 2005

(51) Int. Cl.
B23P 6/00 (2006.01)
(52) U.S. Cl. ............ 29/889.1; 29/402.16; 29/402.09; 415/200; 228/119
(58) Field of Classification Search ............ 29/889.1, 29/889.7, 402.08, 402.13, 402.16; 228/119; 415/200
See application file for complete search history.

(56) References Cited

U.S. PATENT DOCUMENTS

| | | | |
|---|---|---|---|
| 3,678,570 A | 7/1972 | Paulonis et al. ............ 29/498 |
| 4,008,844 A | 2/1977 | Duvall et al. ............ 228/119 |
| 4,028,787 A | 6/1977 | Cretella et al. ............ 29/156.8 |
| 4,726,101 A * | 2/1988 | Draghi et al. ............ 29/889.1 |
| 5,142,778 A | 9/1992 | Smolinski et al. ......... 29/889.1 |
| 5,156,321 A * | 10/1992 | Liburdi et al. ............ 228/119 |
| 5,522,134 A * | 6/1996 | Rowe et al. ............ 29/889.1 |
| 5,523,169 A * | 6/1996 | Rafferty et al. ............ 428/551 |
| 5,674,610 A * | 10/1997 | Schaeffer et al. ........... 428/344 |
| 6,004,683 A * | 12/1999 | Rafferty et al. ............ 428/551 |
| 6,302,318 B1 * | 10/2001 | Hasz et al. ................. 228/254 |
| 6,365,285 B1 * | 4/2002 | Chesnes .................... 428/668 |
| 6,843,960 B2 * | 1/2005 | Krumpelt et al. .............. 419/6 |

* cited by examiner

Primary Examiner—David P. Bryant
Assistant Examiner—Sarang Afzali
(74) Attorney, Agent, or Firm—Tracey R. Loughlin

(57) ABSTRACT

A method of restoring dimensions to an article includes the steps of providing an article having a section requiring dimensional restoration, providing a preform having first and second layers made from different materials, and joining the preform to the article.

33 Claims, 4 Drawing Sheets

METHOD OF RESTORING DIMENSIONS OF AN AIRFOIL AND PREFORM FOR PERFORMING SAME

TECHNICAL FIELD

The present invention relates generally to a method of restoring an article such as an airfoil, and, more specifically, to a method of restoring an airfoil using a two-layer preform.

BACKGROUND ART

A gas turbine engine includes a compressor section, a combustion section, and a turbine section. Disposed within the turbine section are alternating rows of rotatable blades and static vanes. As hot combustion gases pass through the turbine section, the blades are rotatably driven, turning a shaft and thereby providing shaft work for driving the compressor section and other auxiliary systems. The higher the gas temperature, the more work that can be extracted in the turbine section and the greater the overall efficiency. In order to increase the turbine section operating temperature capability, cobalt and nickel based superalloy materials are used to produce the turbine airfoil blades and vanes. Such materials maintain mechanical strength at high temperatures.

The static vanes, disposed between the rows of rotating blades, stabilize and direct the gas flow from one row of rotating turbine blades to the next row, with a nozzle area defined by the spacing between the adjacent vanes. Such gas flow stabilization optimizes the amount of work extracted in the turbine section. Generally, the nozzle flow area is assigned a series of classification numbers that correlate to the volumetric gas flow. This allows comparison of flow properties between vanes of complex geometry. The nozzle area is therefore defined for convenience in terms of a class size.

In service, deterioration of the vane surface(s) occurs due to oxidation and metal erosion caused by abrasives and corrosives in the flowing gas stream impinging on the vane. In addition, high gas loadings at high temperature promote distortion of the vanes, thereby enlarging the nozzle flow area, with a consequent loss in turbine efficiency. During a periodic engine overhaul, the vanes are inspected for physical damage and evaluated to determine the degree of flow area change (typically by determining the effect on nozzle classification). Before such vanes can be returned to the engine, any eroded material must be replaced and the vanes returned to the original classification (referred to as being "reclassified"). In addition, any vanes which suffer a loss of metal or a change in shape due to coating removal or repair must be reclassified.

Several methods exist for reclassifying. One method involves hot striking or otherwise bending the trailing edge of the vane, narrowing the gap between adjacent vanes. However, such bending introduces stresses that may produce cracks in the vane. Such bending may also cause excessive distortion of the vane, preventing the proper fit and seal of the internal cooling tubes. The fixturing devices, which hold the vanes during bending, may also distort the vane platform or crush the vane pedestal. Even if bending stresses can be reduced, hot forming or bending of certain high temperature alloys is not performed to avoid affecting material properties such as fatigue strength. Because the bending process does not add metal to the vane surface, there is no strength contribution. As such, the repaired vane does not have as long a useful life as a new vane.

Another method for reclassifying turbine vanes involves the addition of an alloy to the deteriorated vane surface by a combined weld/plasma spray process, such as that described in U.S. Pat. No. 4,028,787 to Cretella et al. This process requires the addition of weld beads to the worn surface for reinforcement, with a number of plasma sprayed layers of the alloy then added to achieve the proper alloy thickness. This procedure is very labor intensive requiring a welder to add a number of weld beads to a small surface, clean the vane, and then add a number of plasma spray layers. In addition, the vane may be damaged due to the thermal stresses involved in the welding operation.

Another issue with the weld/plasma spray process involves the specific area of deterioration. It is to be expected that deterioration will be more severe at the narrowest nozzle dimension where the velocity of the gas flow is highest. During the plasma spray process, alloy is added to the surface in very thin layers, forming a broad even pattern. After completion of the plasma spray, the excess material must be removed from non-eroded areas of the vane. If the deterioration is severe in specific areas, numerous layers of the alloy must be added and much of it removed from the non-eroded areas. Such a procedure is time consuming and wasteful of the alloy materials involved.

Still another method for refurbishing gas turbine vanes is shown in U.S. Pat. No. 4,726,101 to Draghi et al. In this method, a build up of alloy in the wear area is accomplished by controllably applying layers of a tape of uniform thickness to the vane. The tape includes a mixture of a binder and an alloy powder, which is compatible with the substrate alloy, with the mixture formed into a sheet of uniform thickness and having an adhesive backing. After applying the tape in layers to a desired thickness, the vane is heated to a temperature at which the binder and adhesive decompose and the alloy in the tape diffusion bonds with the substrate alloy.

Yet another method for refurbishing a gas turbine vane covered by a protective coating is shown in U.S. Pat. No. 5,142,778 to Smolinski et al. In this method, the protective coating is first removed from the surface of the vane. Thereafter, material is added to surfaces of the vane in the areas requiring repair or replacement of the eroded material and bonded to the surfaces. A laser beam is then directed at the surface in the distorted areas such that localized areas of the surface of the distorted areas are melted, solidified, and cooled to ambient temperature to form a recast layer. Any excess material is removed from the surface and the protective coating is reapplied.

Another method for refurbishing gas turbine vanes is disclosed in U.S. Pat. No. 5,522,134 to Rowe et al. The method of restoration in Rowe et al. includes the steps of cutting a plate of pre-sintered material that is either cobalt or nickel-based and machining the plate so the plate includes the appropriate thicknesses throughout. Thereafter, any protective coatings are removed from the material and the airfoil to which the material will be added is degreased and cleaned. The plate is then positioned over the area of the airfoil that needs to be repaired or refurbished and the plate is welded to the airfoil by resistance tack welding.

The current industry practice is to use a single layer preform for restoring dimensions of an airfoil, wherein the single layer includes two intermixed or blended components, namely a base alloy and a low melt phase alloy. The airfoil and the preform are subjected to braze melt and diffusion heat cycles. Due to certain alloying elements in the low melt phase alloy, the single layer preform has a lower oxidation resistance than preferred, thus possibly leading to premature removal of turbine engines or airfoils.

SUMMARY OF THE INVENTION

In accordance with one aspect of the present invention, a method of restoring dimensions to an article includes the steps of providing an article having a section requiring dimensional restoration, providing a preform having first and second layers made from different materials, and joining the preform to the article.

According to a further aspect of the present invention, a method of refurbishing an airfoil to restore a desired flow area includes the steps of providing an article having a section requiring dimensional restoration and providing a preform having first and second layers made from different materials. The method further includes the steps of placing the preform adjacent the section of the article requiring dimensional restoration and subjecting the article with adjacent preform to heat.

According to yet another aspect of the present invention, a method of restoring dimensions of an airfoil comprises the steps of providing an airfoil having a section requiring dimensional restoration and providing a preform having first and second layers made from different materials. The method further includes the steps of preparing the airfoil for attachment of the preform thereto, placing the preform to a convex side of the airfoil, and subjecting the airfoil and preform to heat so as to cause the preform to soften and conform to the airfoil.

According to a further alternative aspect of the present invention, a method of restoring dimensions to an article comprises the step of providing an article made of a material. The method further includes the steps of providing a preform having a first layer of material similar to said article and a second layer different than said first layer and joining the preform to the article.

In accordance with another aspect of the present invention, a preform for restoring dimensions to an article comprises a first layer of a material similar to the article and a second layer of a material different than the first layer, wherein the preform is joined to the article to restore the dimensions.

Other aspects and advantages of the present invention will become apparent upon consideration of the following detailed description.

DETAILED DESCRIPTION OF THE PREFERRED EMBODIMENTS

Figure 1:
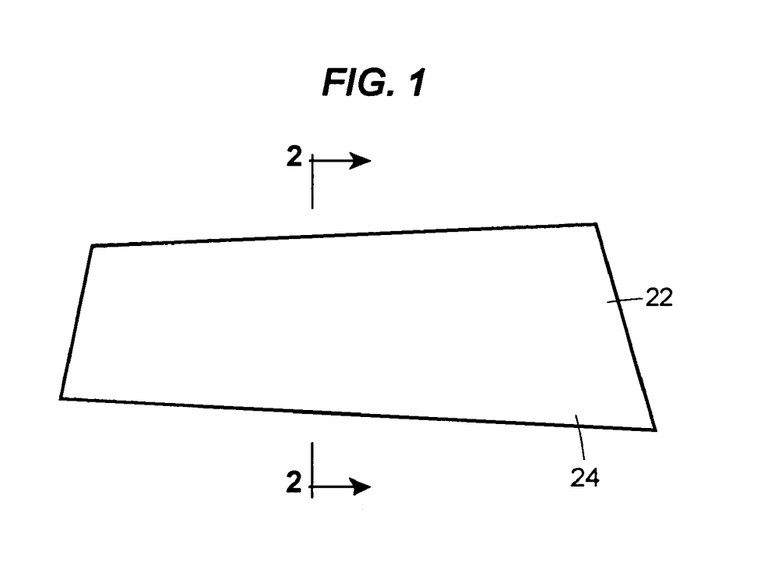
FIG. 1 is a plan view of one embodiment of a preform of the present invention.
Figure 2:
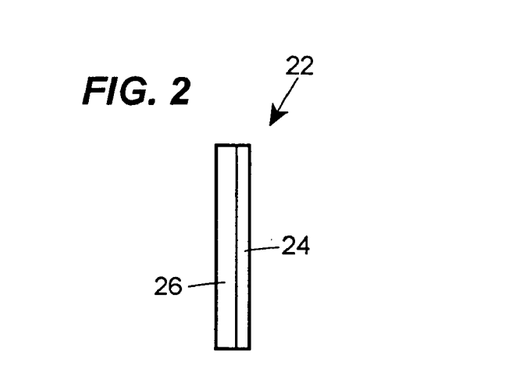
FIG. 2 is a sectional view taken generally along the lines 2-2 of FIG. 1.
Figure 3:
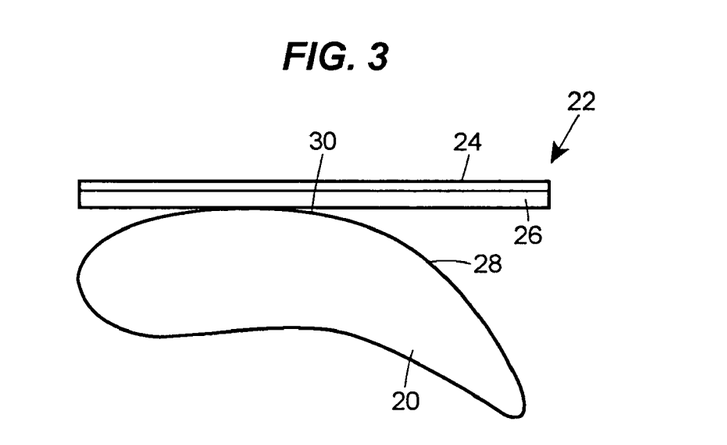
FIG. 3 is a sectional view similar to that of FIG. 2 of one embodiment of the preform of the present invention tacked onto an airfoil.

As seen in FIGS. 1-3, the method of restoring or refurbishing an article such as an airfoil 20 (e.g. a gas turbine vane), involves the use of a two-layer pre-cut, pre-machined preform 22 to restore a desired flow area of the airfoil 20. The preform 22 is preferably formed from pre-sintered materials, wherein the preform 22 includes a top layer 24 and a bottom layer 26. The top layer 24 should be composed of a material having mechanical properties similar to that of the airfoil 20 such that the airfoil 20, when restored, performs as it did before restoration. Even though the top layer 24 should have similar mechanical properties to the properties of the airfoil 20, the compositions of the alloys need not be identical. Preferably, however, the top layer 24 is composed of the same material as the airfoil 20.

The bottom layer 26 has a different composition than the top layer 24. The bottom layer 26 is preferably made of a material having mechanical properties similar to that of the airfoil 20 and another alloy such as a Transient Liquid Phase (TLP) alloy. TLP is a low melt component that has a high boron content. The boron is a melting point depressant that reduces the overall melting point of the bottom layer 26. The top layer 24, when compared to the bottom layer 26, has superior oxidation resistance. This resistance is beneficial since, during engine operation, the airfoil 20 resides in a high temperature environment conducive to oxidation.

The airfoil 20 may be manufactured of any nickel or cobalt-based alloy conventionally used for these types of articles. Such nickel-based alloys include, but are not limited to, PWA 655, PWA 1484, PWA 1422, PWA 1447, PWA 1455, PWA 1480, Rene N-5, Rene N-6, Rene 77, Rene 80, Rene 125, CSMX-4, and CMSX-10 nickel-based alloys. Cobalt based alloys that may be used include, but are not limited to, Mar-M-509, Stellite 31, and WI 52, among other cobalt-based alloys. As one example, the airfoil 20 could be a nickel-based alloy, having a nominal composition of 12.5% Cr, 6.1% Al, 4.2% Mo, 2% Nb, 0.8% Ti, 0.12% C, 0.1% Zr, 0.012% B, and balance Ni (where % is in weight %).

As noted previously, the top layer 24 of the preform 22 may include the same nickel or cobalt-based alloy or a nickel or cobalt-based alloy having very similar mechanical properties to those of the airfoil 20, including, but not limited to, mechanical properties such as creep strength and corrosion resistance. If possible, the mechanical properties of the alloy used in the top layer 24 of the preform 22 should be exactly the same as those of the airfoil 20 (in other words, the same alloy should be used, if possible). Otherwise, the alloy used for the top layer 24 should have mechanical properties as close to the mechanical properties of the airfoil 20 as possible. In the example described in the paragraph above, the top layer 24 preferably has a nominal composition of 12.5% Cr, 6.1% Al, 4.2% Mo, 2% Nb, 0.8% Ti, 0.12% C, 0.1% Zr, 0.012% B, and balance Ni.

The bottom layer 26 of the preform 22 may also include an alloy having similar mechanical properties to those of the airfoil 20, along with at least one other alloy. U.S. Pat. No. 4,073,639 describes one possible material for the bottom layer. If possible, the bottom layer should use the same alloy as the airfoil 20 and the other alloy should be a TLP alloy. In the example described in the paragraphs above, the bottom layer 26 preferably has a mixture of a first alloy with a nominal composition of 12.5% Cr, 6.1% Al, 4.2% Mo, 2% Nb, 0.8% Ti, 0.12% C, 0.1% Zr, 0.012% B, and balance Ni, and a second alloy with a nominal composition of 9.0% Cr, 8.0% Co, 4.0% W, 3.0% B, 2.0% Al, 1.0% Hf and balance Ni (wherein % is in weight %).

In the embodiment of the present invention described herein, pre-sintered materials are preferred because they result in a high density material with little shrinkage and a substantially uniform microstructure. The method of making the preform 22 will now be described.

The material of the top layer 24 of the preform 22 is formed by blending a powder form of the alloy forming the airfoil 20, or an alloy having similar mechanical properties as the airfoil 20, and a suitable amount of a binder. The binder may be a powder wax binder, a solid wax binder, a liquid plastics binder, a gel-type binder, or any other binder known in the industry. Specific examples of liquid plastics binders used in the industry include, but are not limited to, Nicrobraz Cement 310, 510, 320, 520, and 650 and a specific example of a gel-type binder includes, but is not limited to, Nicrobraz Cement S. A subsequent step in the manufacture of the preform 22 removes the binder.

The material of the bottom layer 26 of the preform 22 is formed by blending a powder form of the alloy forming the airfoil 20 or an alloy having similar mechanical properties as the airfoil 20 ("first alloy"), a powder form of another alloy ("second alloy"), and a suitable amount of a binder. Any suitable weight percentage of first and second alloys could be used. For example, the material could have approximately 49-71% of the first alloy and 29-51% of the second alloy. Preferably, the material has approximately 60% of the first alloy and approximately 40% of the second alloy. The amount of binder used is preferably between about 3% and about 5% of the total powder weight % for the bottom layer 26. For example, to prepare a powder of 100 grams for the bottom layer 26 with 4% binder, 57.6 grams of the first alloy, 38.4 grams of the second alloy, and 4 grams binder are combined. Once the binder is removed during manufacture thereof, the bottom layer 26 includes approximately 60% of the first alloy and approximately 40% of the second alloy.

Thereafter, the material of the bottom layer 26 in the form of a blended powder is pressed in a die set using conventional techniques to a suitable thickness, such as about 0.027 inch to about 0.037 inch, and the material of the top layer 24 in the form of a blended powder is sprinkled onto the pressed powder of the bottom layer 26 and the combination is thereafter pressed in the die set. The top and bottom layers 24, 26 are thereafter debinded and sintered. Debinding removes the binders from the layers 24, 26 by heating the layers 24, 26 to about 930 degrees Celsius and remaining at that temperature for about 1 hour in an argon atmosphere. Sintering consists of heating the layers 24, 26 to about 1110 degrees Celsius for about 1 hour. The sintering process produces a perform 22 having sufficient hardness to handle. Once the preform 22 is sintered, any handling of the material should maintain the cleanliness of the preform 22 (e.g. handle the preform 22 with gloves).

After sintering, the preform 22 preferably has a uniform thickness throughout. The top layer 24 preferably has a uniform thickness and occupies between approximately 20-33% of the thickness of the preform, preferably approximately 30%. The bottom layer 26 also preferably has a uniform thickness and occupies the remaining approximately 67-80% of the thickness of the preform, preferably approximately 70%. As an example, the preform 22 could have a uniform thickness throughout from about 0.025 inch to about 0.045 inch, and preferably about 0.035 inch. The top layer 24 could have a uniform thickness from about 0.005 inch to about 0.015 inch, and more preferably about 0.010 inch and the bottom layer 26 could have a uniform thickness from about 0.020 inch to about 0.030 inch, and more preferably about 0.025 inch.

Generally, an airfoil 20 may become worn due to erosion, sulfidation, oxidation, or become damaged due to other events. In order to continue using the airfoil 20, the airfoil 20 must be restored. Further, to restore the airfoil 20, the preform 22 must first be formed having a top layer 24 and a bottom layer 26 as described above and having a size that is appropriate to cover an entire convex 30 portion of the airfoil 20 that needs to be restored or refurbished. Thereafter, any protective coating on the turbine vane 32 should be chemically stripped from the turbine vane 32, such as by using conventional methods and formulations. The formulation used to strip the turbine vane 32 of protective coatings depends on the type of coating on the turbine vane 32. After stripping of any of the protective coatings, the turbine vane 32 may need to undergo cleaning, such as fluoride ion cleaning, which removes and converts any oxide thereon to gaseous fluoride. Once the turbine vane 32 is stripped and cleaned, the airfoil 20 is ready to be restored.

Once the turbine vane 32 is stripped and cleaned, the preform 22 is thereafter placed and tack welded adjacent the convex portion 30 of the airfoil 20 such that the top layer 24 is facing away from the airfoil 20 and the bottom layer 26 is facing towards the airfoil 20. The preform 22 is preferably centered (lengthwise and widthwise) over the airfoil 20 in order to cover the entire area that needs to be repaired.

Figure 4:
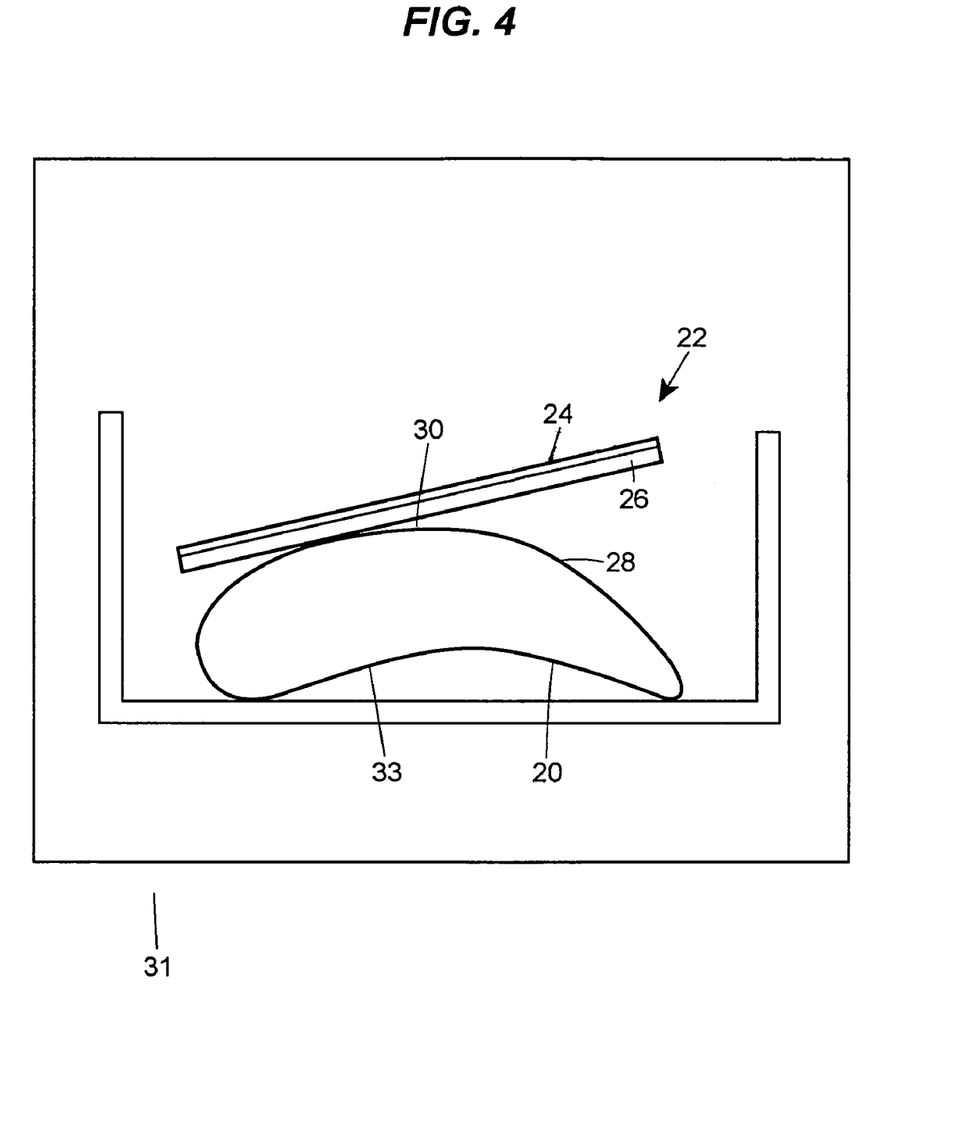
FIG. 4 is a sectional view similar to that of FIG. 2 of one embodiment of the preform of the present invention tacked onto an airfoil resting on a basket in a furnace.
Figure 5:
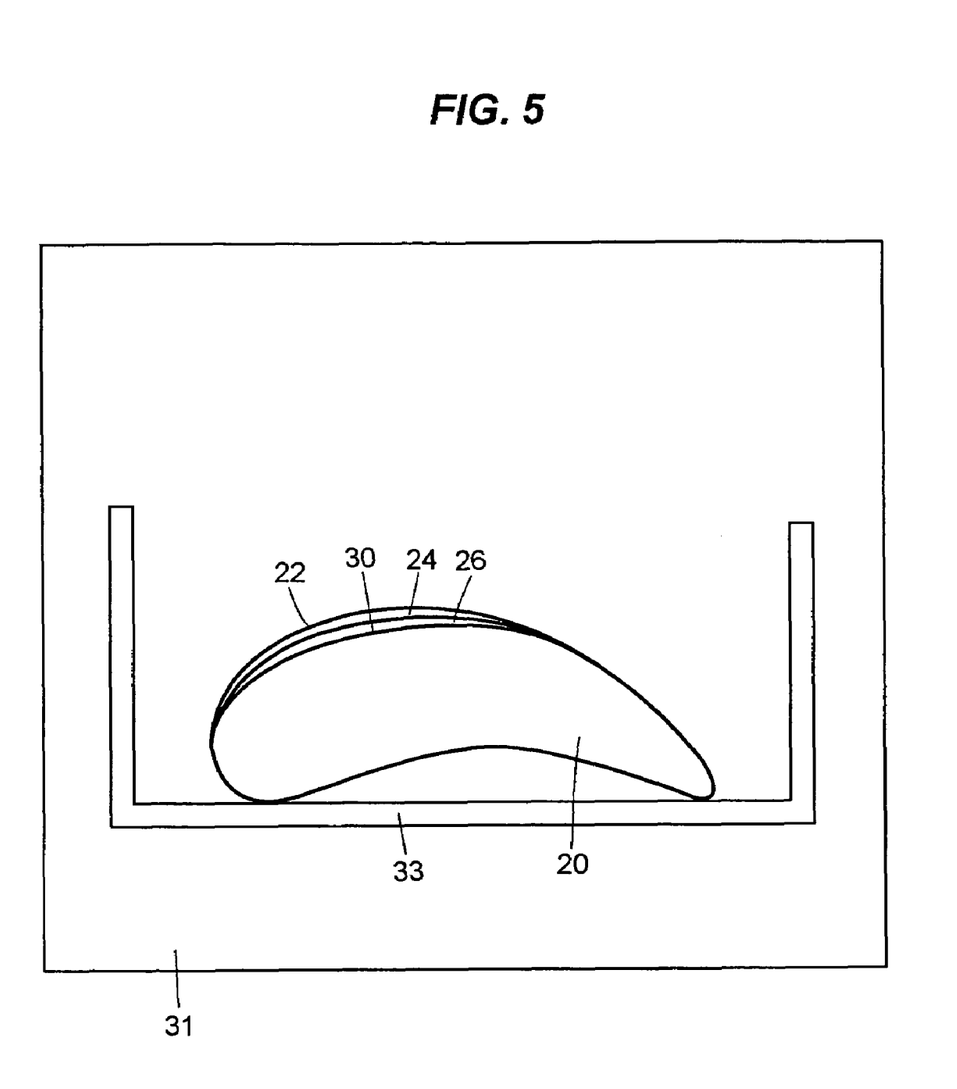
FIG. 5 is a sectional view similar to that of FIG. 2 of one embodiment of the preform of the present invention melted and fused on a convex portion of the airfoil and resting on a basket in a furnace.

The airfoil 20 with adjacent preform 22 is thereafter placed into a furnace or heat chamber 31 preferably with the concave side of the airfoil resting on a basket 33 as seen in FIG. 4. While in the furnace or heat chamber 31, the preform 22 is subjected to a heat treatment that softens the preform 22 such that the preform 22 conforms to the convex portion 30 of the airfoil 20 due to gravity. The airfoil 20 and preform 22 are subjected first to a melt cycle and secondly to a diffusion cycle. The melt cycle typically comprises heating the airfoil 20 and preform 22 to a temperature of between about 2125 degrees Fahrenheit and about 2155 degrees Fahrenheit, and preferably about 2140 degrees Fahrenheit, for about 15 minutes or less. Thereafter, the diffusion cycle includes the steps of heating the airfoil 20 and preform 22 to a temperature of between about 2125 degrees Fahrenheit and about 2155 degrees Fahrenheit, and preferably about 2140 degrees Fahrenheit, for a maximum of six and a half hours and thereafter heating the same to a temperature of between about 1900 degrees Fahrenheit and about 1950 degrees Fahrenheit, and preferably about 1925 degrees Fahrenheit, for about two hours. When the airfoil 20 and preform 22 are removed from the furnace or heat chamber, the preform 22 is already melted and conformed to the airfoil 20. FIG. 5 is an illustration of the preform 22 melted and fused on the convex portion 30 of the airfoil 20 after the melt and diffusion cycles and just prior to its removal from the furnace or heat chamber 31.

Figure 6:
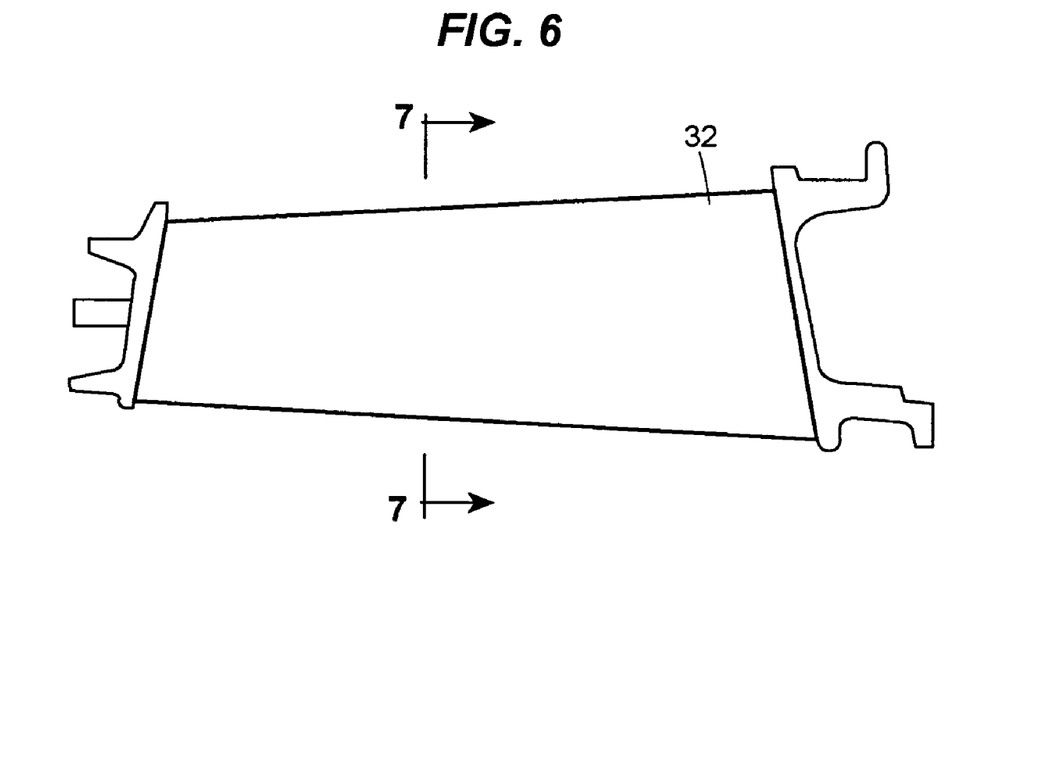
FIG. 6 is a plan view of a turbine vane with one embodiment of a preform of the present invention melted and fused on a convex portion of the airfoil.
Figure 7:
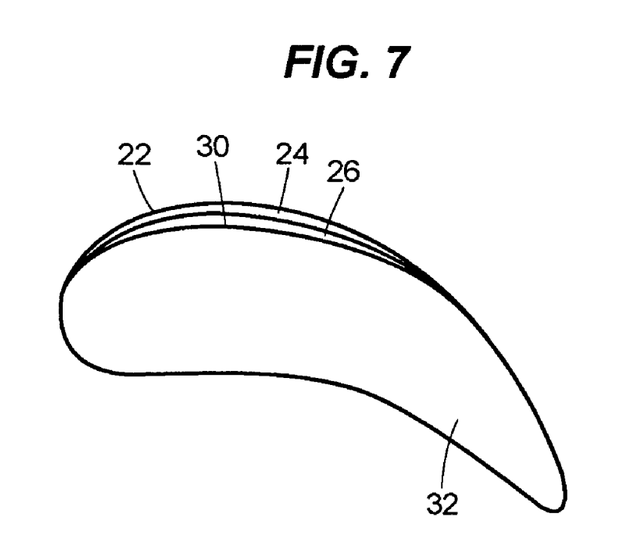
FIG. 7 is a sectional view taken generally along the lines 7-7 of FIG. 6.

FIGS. 5-7 illustrate a gas turbine vane 32 with preform 22 melted and conformed to the convex of the airfoil, as one specific example of the present invention. As may be seen in FIGS. 5-7, the bottom layer 26 of the preform 22 conforms to the convex portion 30 of the turbine vane 32 and the top layer 24 conforms to the bottom layer 26 and convex portion 30 of the preform 22. Once an airfoil 20 or turbine vane 32 with preform 22 tacked thereto is removed from the furnace or heat chamber 31, the airfoil 20 must be polished and a protective coating must be applied to the turbine vane 32.

While the method of the present invention has been described in the context of repairing airfoils, and more specifically gas turbine vanes, it should be recognized that the method of the present invention may be utilized to repair, restore, or refurbish a surface of any airfoil or hydrofoil.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. A method of restoring dimensions to an article, the method comprising the steps of:
    providing an article having a section requiring dimensional restoration;
    providing a rigid sintered preform having first and second layers made from different materials, the first and second layers having mechanical properties similar to that of the article, the second layer comprising a low melting point component such that the second layer has a lower melting point than the first layer, the first layer having better oxidation resistance than the second layer, wherein the mid sintered preform is formed as a two-layered rigid sintered preform prior to being provided here, and wherein the first layer is disposed closest to the article between the article and the second layer; and
    joining the preform to the article.

2. The method of claim 1, wherein the first layer of the preform includes a nickel-based alloy.

3. The method of claim 2, wherein the second layer of the preform includes a nickel-based alloy and a second alloy.

4. The method of claim 3, wherein said second alloy is a transient liquid phase alloy.

5. The method of claim 1, wherein the first layer of the preform is between about 0.005 inch and about 0.015 inch in thickness.

6. The method of claim 5, wherein the second layer of the preform is between about 0.020 inch and about 0.030 inch in thickness.

7. The method of claim 1, wherein the article is an airfoil.

8. The method of claim 7, wherein the airfoil is a turbine vane.

9. The method of claim 1, wherein the joining step includes subjecting the article and preform to heat, wherein the preform melts to conform to the shape of the article.

10. The method of claim 1, wherein providing the rigid sintered preform comprises:
    providing a predetermined amount of a first blended powder, the first blended powder comprising a first powder, a second powder and a binder mixed together;
    pressing the blended powder in a die to form the second layer;
    adding a predetermined amount of a second blended powder onto the pressed second layer, the second blended powder comprising the first powder and the binder mixed together;
    pressing the second blended powder and the second layer in the die together to form the preform; and
    sintering the preform.

11. A method of refurbishing an article to restore a desired flow area, the method comprising the steps of:
    providing an article having a section requiring dimensional restoration;
    providing a rigid sintered preform having first and second layers made from different materials, the first and second layers having mechanical properties similar to that of the article, the second layer comprising a low melting point component such that the second layer has a lower melting point than the first layer, the first layer having better oxidation resistance than the second layer, wherein the rigid sintered preform is formed as a two-layered rigid sintered preform prior to being provided here, and wherein the first layer is disposed closest to the article between the article and the second layer;
    placing the preform adjacent the section of the article requiring dimensional restoration; and
    subjecting the article and preform to heat.

12. The method of claim 11, wherein the article and preform are subjected to heat of between about 2125 degrees Fahrenheit and about 2155 degrees Fahrenheit for 15 minutes or less.

13. The method of claim 12, wherein the article and preform are thereafter subjected to heat of between about 2125 degrees Fahrenheit and about 2155 degrees Fahrenheit for 6½ hours or less.

14. The method of claim 13, wherein the article and preform are thereafter subjected to heat of between about 1900 degrees Fahrenheit and about 1950 degrees Fahrenheit for about 2 hours.

15. The method of claim 11, wherein the first layer of the preform includes a nickel-based alloy.

16. The method of claim 15, wherein the second layer of the preform includes a nickel-based alloy and a second alloy.

17. The method of claim 16, wherein said second alloy is a transient liquid phase alloy.

18. The method of claim 11, wherein providing the rigid sintered preform comprises:
    providing a predetermined amount of a first blended powder, the first blended powder comprising a first powder, a second powder and a binder mixed together;
    pressing the blended powder in a die to form the second layer;
    adding a predetermined amount of a second blended powder onto the pressed second layer, the second blended powder comprising the first powder and the binder mixed together;
    pressing the second blended powder and the second layer in the die together to form the preform; and
    sintering the preform.

19. A method of restoring dimensions of an airfoil, the method comprising the steps of:
    providing an airfoil having a section requiring dimensional restoration;
    providing a rigid sintered preform having first and second layers made from different materials, the first and second layers having mechanical properties similar to that of the airfoil, the second layer comprising a low melting point component such that the second layer has a lower melting point than the first layer, the first layer having better oxidation resistance than the second layer, wherein the rigid sintered preform is formed as a two-layered rigid sintered preform prior to being provided here, and wherein the first layer is disposed closest to the article between the article and the second layer;
    preparing the airfoil for attachment of the preform thereto;
    placing the preform adjacent a convex side of the airfoil; and subjecting the airfoil and preform to heat so as to cause the preform to soften and conform to the airfoil.

20. The method of claim 19, wherein the first layer of the perform includes a nickel-based alloy.

21. The method of claim 20, wherein the second layer of the perform includes a nickel-based alloy and a second alloy.

22. The method of claim 21, wherein said second alloy is a transient liquid phase alloy.

23. The method of claim 19, wherein the preparing step includes the step of removing any protective coatings on the turbine vane.

24. The method of claim 23, wherein the preparing step further includes the step of cleaning the turbine vane.

25. The method of claim 19, wherein the step of subjecting the airfoil and preform to heat includes the step of heating the airfoil and preform in a furnace or heat chamber.

26. The method of claim 25, wherein the airfoil is placed in the furnace or heat chamber with a convex side of the airfoil facing upwards.

27. The method of claim 19, wherein providing the rigid sintered preform comprises:
   providing a predetermined amount of a first blended powder, the first blended powder comprising a first powder, a second powder and a binder mixed together;
   pressing the blended powder in a die to form the second layer;
   adding a predetermined amount of a second blended powder onto the pressed second layer, the second blended powder comprising the first powder and the binder mixed together;
   pressing the second blended powder and the second layer in the die together to form the preform; and
   sintering the preform.

28. A method of restoring dimensions to an article, the method comprising the steps of:
   providing an article made of a material;
   providing a rigid sintered preform having a first layer of a material similar to said article and a second layer different than said first layer, the first and second layers having mechanical properties similar to that of the article, the second layer comprising a low melting point component such that the second layer has a lower melting point than the first layer, the first layer having better oxidation resistance than the second layer, wherein the rigid sintered preform is formed as a two-layered mid sintered preform prior to being provided here, and wherein the first layer is disposed closest to the article between the article and the second layer; and
   joining the preform to the article.

29. The method of claim 25, wherein said first layer material is the same as said article.

30. The method of claim 26, wherein said first layer is a nickel-based alloy.

31. The method of claim 27, wherein the second layer of the perform is a nickel-based alloy and a second alloy.

32. The method of claim 28, wherein said second alloy is a transient liquid phase alloy.

33. The method of claim 28, wherein providing the rigid sintered preform comprises:
   providing a predetermined amount of a first blended powder, the first blended powder comprising a first powder, a second powder and a binder mixed together;
   pressing the blended powder in a die to form the second layer;
   adding a predetermined amount of a second blended powder onto the pressed second layer, the second blended powder comprising the first powder and the binder mixed together;
   pressing the second blended powder and the second layer in the die together to form the preform; and
   sintering the preform.

* * * * *

UNITED STATES PATENT AND TRADEMARK OFFICE
CERTIFICATE OF CORRECTION

| | | |
|---|---|---|
| PATENT NO. | : 7,343,676 B2 | Page 1 of 1 |
| APPLICATION NO. | : 10/767478 | |
| DATED | : March 18, 2008 | |
| INVENTOR(S) | : Sor Tin Ng | |

It is certified that error appears in the above-identified patent and that said Letters Patent is hereby corrected as shown below:

In column 7, claim 1, line 26 - replace the words "mid sintered preform" with --rigid sintered preform--.

Signed and Sealed this

Twenty-fourth Day of June, 2008

JON W. DUDAS
*Director of the United States Patent and Trademark Office*